United States Patent
Sekine et al.

[11] Patent Number: 5,123,880
[45] Date of Patent: Jun. 23, 1992

[54] METALLIC V-BELT

[75] Inventors: Noboru Sekine, Kasukabe; Takashi Aoki, Fujimi; Shigeru Kanehara, Tokyo; Keiichi Hanyu, Kamifukuoka; Hideaki Yoshida, Ibaraki, all of Japan

[73] Assignee: Honda Giken Kogyo Kabushiki Kaisha, Tokyo, Japan

[21] Appl. No.: 614,781

[22] Filed: Nov. 14, 1990

[30] Foreign Application Priority Data

Nov. 16, 1989 [JP] Japan .................. 1-133341

[51] Int. Cl.⁵ ............................................. F16G 5/16
[52] U.S. Cl. ............................................... 474/244
[58] Field of Search ............... 474/201, 242, 244, 248, 474/260-262, 265, 270

[56] References Cited

U.S. PATENT DOCUMENTS

| | | | |
|---|---|---|---|
| 2,590,988 | 4/1952 | Martin | 474/242 |
| 2,643,550 | 6/1953 | Borgna | 474/242 |
| 3,949,621 | 4/1976 | Beusink | 474/242 X |
| 4,299,586 | 11/1981 | Van Der Hardt Aberson | 474/242 X |
| 4,303,403 | 12/1981 | Lamers | 474/201 |
| 4,512,753 | 4/1985 | Hattori | 474/242 |
| 4,552,549 | 11/1985 | Hattori | 474/242 X |
| 4,612,005 | 9/1986 | Miranti | 474/244 X |
| 4,642,080 | 2/1987 | Takano et al. | 474/244 |
| 4,698,050 | 10/1987 | Hattori et al. | 474/242 |

FOREIGN PATENT DOCUMENTS

| | | | |
|---|---|---|---|
| 3039337 | 5/1981 | Fed. Rep. of Germany | 474/201 |
| 36248 | 3/1977 | Japan | 474/265 |
| 55-6783 | 2/1980 | Japan | |
| 61-54976 | 11/1986 | Japan | |

*Primary Examiner*—Ramon S. Britts
*Assistant Examiner*—Roger J. Schoeppel
*Attorney, Agent, or Firm*—Lyon & Lyon

[57] ABSTRACT

A metallic V belt for use in a V-belt-type continuously variable transmission has an endless metallic belt strap and a plurality of metallic blocks each having a strap insertion slot defined therein and opening outwardly of the V belt at one side of the metallic block, the metallic blocks being mounted on that belt strap with the belt strap positioned in the strap insertion slots in the metallic blocks. A retaining belt strap or retainer is disposed in engagement with portions of the metallic blocks in covering relation to the endless belt strap in the strap insertion slots for retaining the metallic blocks against dislodgment from the belt strap. The retainer is in the form of an endless web having a flat transverse cross section and having at least one hole defined in the endless web. The hole in the endless web may be a slot, a narrow slit, or an elliptical hole.

14 Claims, 7 Drawing Sheets

METALLIC V-BELT

BACKGROUND OF THE INVENTION

The present invention relates to a power-transmitting metallic V belt for use in a V-belt-type continuously variable transmission.

One known power-transmitting metallic V belt comprises an endless metallic strap and a number of metallic blocks successively mounted on the endless metallic strap, as disclosed in Japanese Patent Publication No. 55(1980)6783. Since both the strap and the blocks are made of a metallic material, and the blocks are required to be slidable with respect to the strap, it is difficult to attach the blocks to the strap.

Japanese Patent Publication No. 61(1986)-S4976 discloses another metallic V belt which comprises a strap made up of a plurality of superposed endless metallic webs and a number of metallic blocks held by the strap. Each of the endless metallic webs has a neck or constricted portion having a reduced width. To install the metallic blocks on the strap, the necks of the metallic webs are aligned with each other, and the metallic blocks are brought onto the metallic webs through the aligned necks. Therefore, the metallic blocks can be installed on the strap relatively easily.

If the necks remained aligned with each other after the blocks and the strap are assembled together, the blocks would be removed from the strap through the necks. Therefore, the metallic webs are longitudinally shifted to position the necks out of alignment with each other, thereby preventing the blocks from being detached from the strap.

While the metallic V belt is in use, however, the metallic webs tend to be displaced positionally with respect to each other, until the necks may finally be aligned with each other allowing the metallic blocks to come off through the necks. If the number of metallic webs used is increased, then the blocks will become more liable to fall from the strap. However, there is a certain practical limitation on the number of metallic webs that can be used.

SUMMARY OF THE INVENTION

In view of the aforesaid problems with the conventional metallic V belts, it is an object of the present invention to provide a metallic V belt which is constructed to allow metallic blocks to be mounted on a metallic strap easily and reliably.

Another object of the present invention is to provide a metallic V belt which is sufficiently mechanically strong and durable in use.

According to the present invention, the above objects can be achieved by a metallic V belt which includes an endless metallic belt strap, a plurality of metallic blocks each having a strap insertion slot defined therein and opening at one side of the metallic block, the metallic blocks being mounted on the belt strap with the belt strap positioned in the strap insertion slots in the metallic blocks, and a retainer disposed in engagement with the metallic blocks in covering relation to the belt strap in the strap insertion slots, for retaining the metallic blocks against dislodgement from the belt strap, the retainer being in the form of an endless web having a flat transverse cross section, the retainer having at least one hole defined in the endless web. The hole in the endless web may be a slot, a narrow slit, or an elliptical hole. Each of the metallic blocks has a pair of spaced guide edges defining the strap insertion sot therebetween, and a pair of steps extending from the guide edges, the retainer having side edges engaging the steps, respectively. Alternatively, each of the metallic blocks has a pair of spaced guide edges defining the strap insertion slot therebetween, and a pair of attachment grooves defined in the guide edges, respectively, the retainer having side edges inserted in the attachment grooves, respectively.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
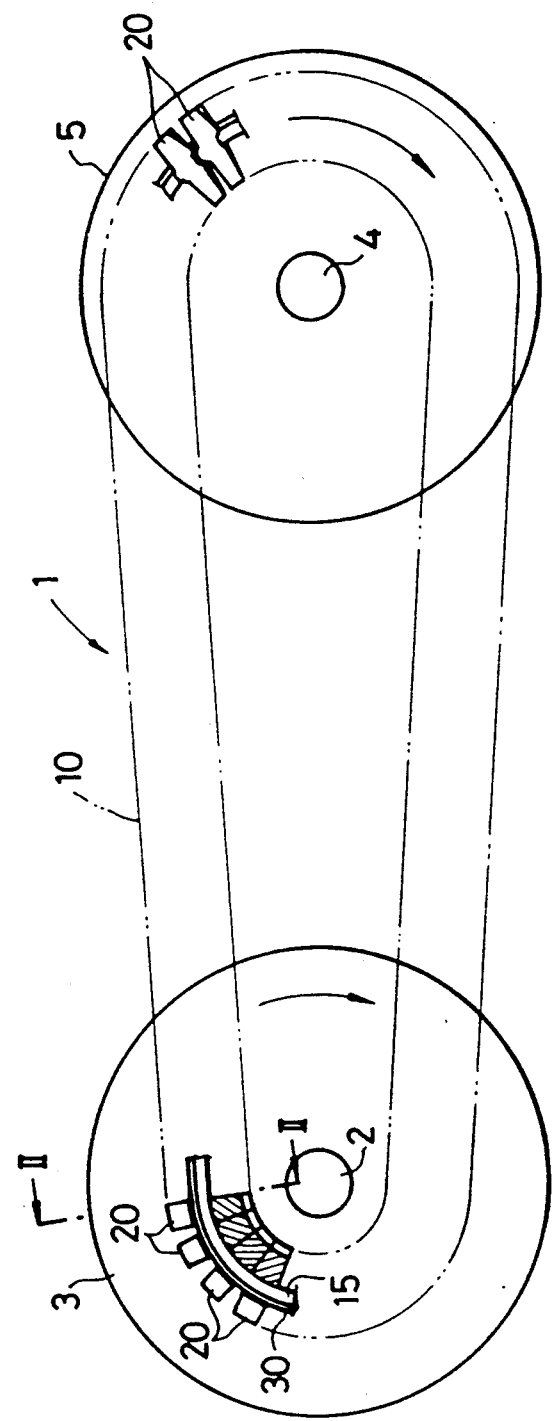
FIG. 1 is a schematic front elevational view of a V-belt-type continuously variable transmission which incorporates a metallic V belt according to the present invention.
Figure 2:
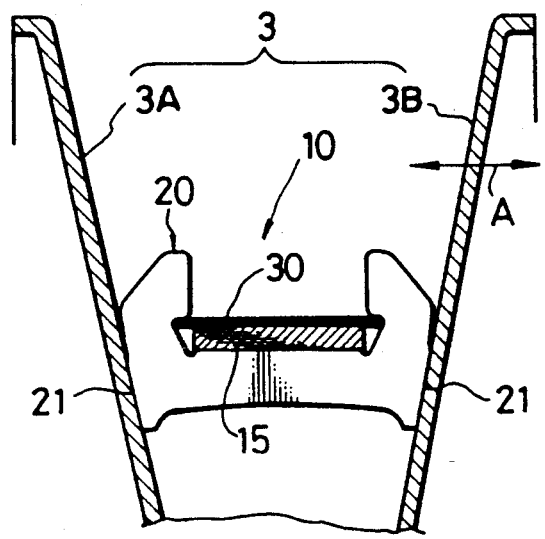
FIG. 2 is an enlarged cross-sectional view taken along line II—II of FIG. 1.

As shown in FIGS. 1 and 2, a V-belt-type continuously variable transmission 1 comprises a drive pulley 3 supported on a drive shaft 2, a driven pulley 5 supported on a driven shaft 4, and a power-transmitting metallic V belt 10 according to the present invention which is trained around the drive and driven pulleys 3, 5. The drive pulley 3 comprises a fixed pulley member 3A fixedly mounted on the drive shaft 2 and a movable pulley member 3B which is relatively nonrotatably mounted on the drive shaft 2 but axially movable thereon in the direction indicated by the arrow A. When the movable pulley member 3B is axially moved toward the fixed pulley member 3A under hydraulic or centrifugal forces, the axial distance therebetween is reduced, and the effective radius of the drive pulley 3 is increased, forcing the metallic V belt 10 to move radially outwardly. When the movable pulley member 3B is axially moved away from the fixed pulley member 3A, the axial distance therebetween is increased, and the effective radius of the drive pulley 3 is reduced, allowing the metallic V belt 10 to move radially inwardly. As with the drive pulley 3 the driven pulley 5 is constructed so that the effective diameter thereof is variable. When the effective diameter of the drive pulley 3 varies, i.e., increases or decreases, as described above, the effective diameter of the driven pulley 5 varies in the opposite direction, i.e., decreases or increases. In this manner, the rotational speed and torque transmitted from the drive shaft 2 to the driven shaft 4 are continuously variable.

The metallic V belt 10 comprises an endless or looplike metallic belt strap 15 composed of a plurality of (ten in the illustrated embodiment) thin metallic layers or webs each having a flat-plate-like transverse cross section, a number of metallic blocks 20 slidably mounted successively on the belt strap 15, and a pair of retaining belt straps 30, hereafter referred to as a retainer 30 or retainers 30, which holds the belt strap 15 on the metallic blocks 20 to prevent the metallic blocks 20 from being detached.

Figure 3:
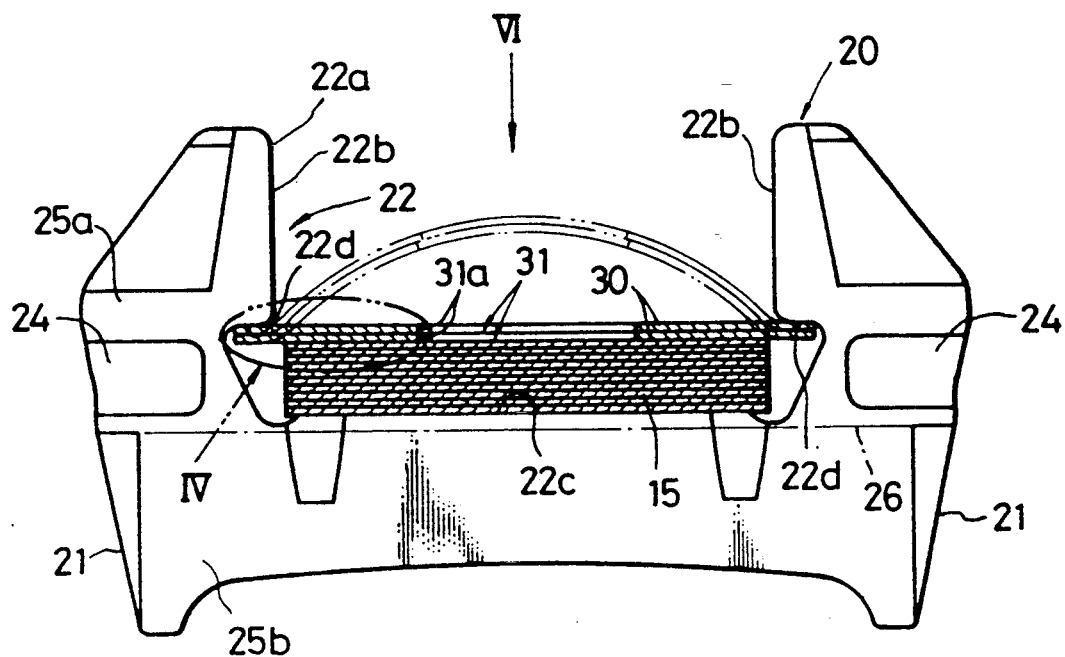
FIG. 3 is an enlarged portion of FIG. 2 showing the transverse cross-sectional view of the metallic V belt in more detail.

As shown in FIGS. 3 through 6, each of the metallic blocks 20 comprises a relatively flat metallic block which is sintered or pressed, and has a pair of contact surfaces 21 on opposite ends. The contact surfaces 21 are progressively spread outwardly in the upward direction, as upper end portions of a V shape, for frictional contact with inner surfaces of the drive and driven pulleys 3, 5. The metallic block 20 also has a substantially U-shaped strap insertion slot 22 defined therein and extending from a front surface to a rear surface thereof. The strap insertion slot 20 has an open end 22a opening at an upper edge (as shown in FIG. 3) of the metallic block 20, and is defined by a pair of laterally spaced guide edges 22b extending downwardly from the open end 22a parallel to each other, and a saddle 22c at the bottom for allowing a lower surface of the belt strap 15 to be seated thereon. Between the guide edges 22b and the saddle 22c, there are defined a pair of recesses having respective steps or shoulders 22d for engagement with upper surfaces of opposite side marginal edges of the retainer 30.

The guide edges 22b are spaced from each other by a distance which is slightly greater than the width of the belt strap 15. The steps 22d have outer ends which are spaced from each other by a distance that is slightly greater than the width of the retainer 30.

Figure 5:
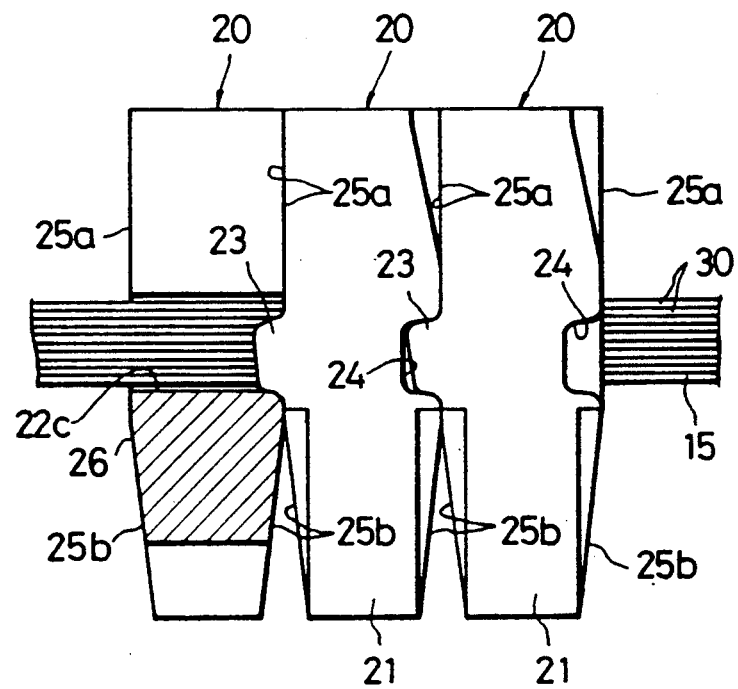
FIG. 5 is a fragmentary front elevational view, partly in cross section, of the metallic V belt.
Figure 6:
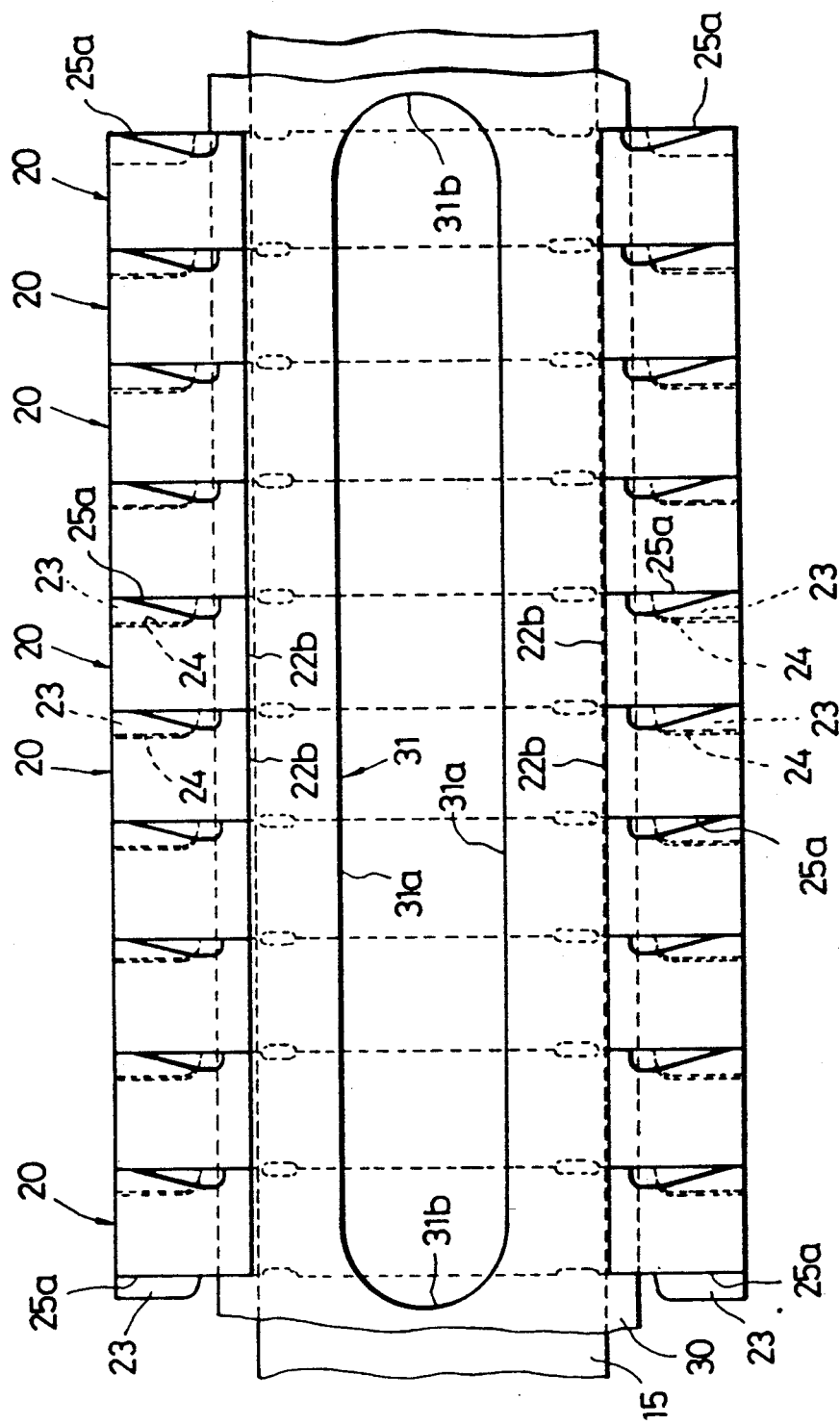
FIG. 6 is an enlarged fragmentary plan view of the metallic V belt, as viewed in the direction indicated by the arrow VI in FIG. 3.

The rear surface of each metallic block 20 has a pair of teeth 23 disposed on respective laterally spaced opposite ends thereof, and the front surface of each metallic block 20 has a pair of recesses 24 defined in respective laterally spaced opposite ends thereof, as shown in FIGS. 5 and 6. The teeth 23 and the recesses 24 are positionally aligned with each other and complementary in shape to each other. When the metallic blocks 20 are disposed on and arrayed successively along the belt strap 15, the teeth 23 and the recesses 24 of the adjacent metallic blocks 20 are held in interfitting engagement, thereby preventing the metallic blocks 20 from being positionally displaced with respect to each other.

As shown in FIGS. 3 and 5, a pivot line 26 extends laterally between the contact surfaces 21 in vertically central regions of the front and rear surfaces of the metallic block 20. In FIG. 5, the front and rear surfaces of the metallic block 20 include a pair of opposite parallel surfaces 25a lying above the pivot line 26, for holding the metallic blocks 20 in intimate contact therethrough between the drive pulley 3 and the driven pulley 5. The front and rear surfaces of the metallic block 20 also include a pair of opposite downwardly tapered surfaces 25b lying below the pivot line 26, for allowing the metallic block 20 to pivot about the pivot line 26 when the V belt 10 is trained around the drive pulley 3 or the driven pulley 5.

As best shown in FIG. 6, each of the retainers 30 has an oblong hole or slot 31 defined transversely centrally therein and extending longitudinally thereof. The slot 31 is defined by a pair of longitudinal straight edges 31a spaced from each other and extending parallel to each other, and a pair of semicircular arcuate edges 31b connected to the opposite ends of the straight edges 31a. The straight edges 31a and the arcuate edges 31b are smoothly joined together to avoid stress concentration.

Figure 4:
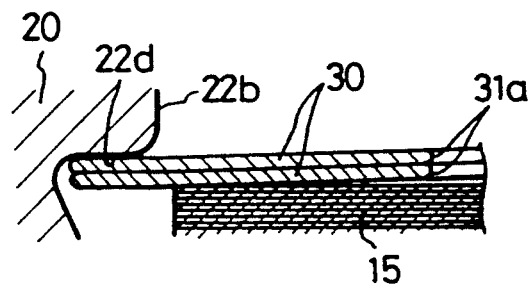
FIG. 4 is an enlarged fragmentary cross-sectional view of an encircled portion indicated by the arrow IV in FIG. 3.

As shown in FIG. 4, the straight edges 31a of the slots 31 in the retainers 30 have corners smoothly rounded into arcuate shapes at the opposite surfaces of the retainers 30 also to avoid stress concentration. Similarly, the arcuate edges 31b have corners smoothly rounded into arcuate shapes at the opposite surfaces of the retainers 30 to avoid stress concentration. However, the straight edges 31a and the arcuate edges 31b may have chamfered corners at the opposite surfaces of the retainers 30.

The metallic V belt 10 is assembled as follows: The two retainers 30 with the slots 30 aligned with each other are superposed on the outer surface of the belt strap 15. Then, the retainers 30 are curved into a gutter shape under external forces applied to their portions where the slots 30 are defined, as indicated by the two-dot-and-dash lines in FIG. 3. Since the slots 31 are defined in the retainers 30, the retainers 30 can easily be curved into the gutter shape. Then, the open end 22a of the strap insertion slot 22 in the metallic block 20 is fitted over the belt strap 15 and the narrow curved portions of the retainers 30, which are therefore engaged by the guide edges 22b. The metallic block 20 is moved transversely over and across the belt strap 15 and the retainers 30 until the inner surface of the belt strap 15 is seated on the saddle 22c at the bottom of the strap insertion slot 22. Thereafter, the metallic block 20 is slid along the belt strap 15 into a region away from the slots 31 where the retainers 30 are not curved or are flat. The opposite marginal edges of the flat retainers 30 now engage the steps 22d of the metallic block 20, which is thus retained on the belt strap 15.

A number of metallic blocks 20 are successively mounted on the belt strap 15 in the manner described above. After the final metallic block 20 is installed on the belt strap 15, the belt strap 15 is extended, allowing the teeth 23 and recesses 24 of the final metallic block 20 to fit into the recess 24 and over the teeth 23 of the adjacent metallic blocks 20. Under the tension of the extended belt strap 15, the confronting parallel surfaces 25a above the pivot line 26 of the metallic blocks 20 are held in intimate contact with each other under predetermined pressure. After the metallic blocks 20 have been installed on the belt strap 15 as described above, the retainers 30 are released from the external forces. As indicated by the solid lines in FIG. 3, the retainers 30 return to their flat configuration, with their entire marginal edges engaging the steps 22d. Finally, the outer retainer 30 is longitudinally moved with respect to the inner retainer 30 to bring their slots 31 out of overlapping alignment with each other. The overall mechanical strength of the two retainers 30 is now uniformized in the circumferential direction thereof.

Power is transmitted from the drive pulley 3 to the driven pulley 5 through the intimately contacting parallel surfaces 25a above the pivot line 26 of the metallic blocks 20. When the V belt 10 is trained around the drive pulley 3 or the driven pulley 5, each of the metallic blocks 20 is angularly moved or pivoted about the pivot line 26. At this time, the adjacent metallic blocks 20 are prevented from physically interfering with each other because of the tapered surfaces 25b below the pivot line 26.

During operation of the V belt 10, it is bent when it is trained around the drive pulley 3 or the driven pulley 5. As the speed reduction ratio of the continuously variable transmission 1 varies, causing the pulleys 3, 5 to be forced out of alignment with each other, the V belt 10 is subjected to torsional deformation. At this time, stresses are applied to the retainers 30. Since the straight and arcuate edges 31a, 31b blend smoothly into each other and are rounded or chamfered at their upper and lower ends, any stress concentration which is imposed on these edges 31a, 31b torsional deformation is lessened, and hence the edges 31a, 31b are prevented from cracking. As a result, the retainers 30 are highly durable against damage in operation. The two separate retainers 30 are subject to much smaller stresses than would be with a single retainer of uniform thickness. The two separate retainers 30 are therefore also of high durability, in addition to the durability given by the slots 31.

The shape and size of the slots 31 in the retainers 30 are one of factors which influence the mechanical strength and durability of the retainers 30. Therefore, the shape and size of the slots 31 will be analyzed below. The V belt 10 as it is trained around the drive and driven pulleys 3, 5 is curved into a cylindrical configuration. Stress concentration on the longitudinal ends of the slots 31 at the time the V belt 10 is thus curved will first be reviewed below.

Figure 7A:
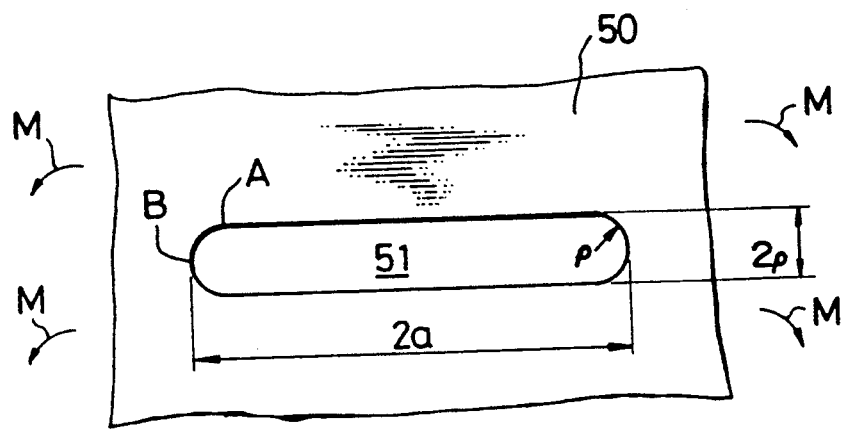
FIGS. 7A and 7B are fragmentary plan and front elevational views, respectively, of an infinite flat plate with an oblong hole or slot, which serves as a model to calculate bending stresses.
Figure 7B:
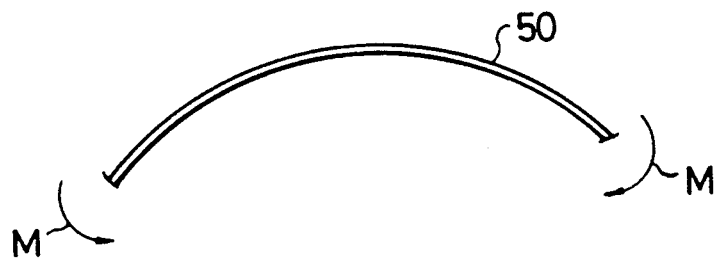

FIG. 7A shows a model for calculating bending stresses, the model comprising an infinite flat plate 50 having an oblong hole or slot 51 which has longitudinally opposite ends defined by semicircular arcuate edges having a radius of $\rho$, the slot 51 having a width of $2\rho$ and a length of $2a$. When a bending moment M (FIG. 7B) normal to the plane of the infinite flat plate 50 and directed in the longitudinal direction of the slot 51 is applied to the infinite flat plate 50, the infinite flat plate 50 is curved into a cylindrical configuration as shown in FIG. 7B. Bending stresses applied to the ends of the slot 51 at respective points A, B are expressed as follows:

$$\sigma A = \frac{(1+\nu)(5-\nu)}{3+\nu} \times \sigma o \quad (1)$$

$$\sigma B = \frac{(1+\nu)(1+3\nu)}{3+\nu} \times \sigma o \quad (2)$$

where $\sigma o$ is a bending stress (reference bending stress) at a position spaced from the slot 51 and $\nu$ is the Poisson ratio.

The retainers 30 are made of steel (YAG250) whose Poisson ratio is 0.3. Therefore, the bending stresses at the points A, B become:

$\sigma A \simeq 1.85 \sigma o$ $\sigma B \simeq 0.75 \sigma o$, respectively.

Figure 8:
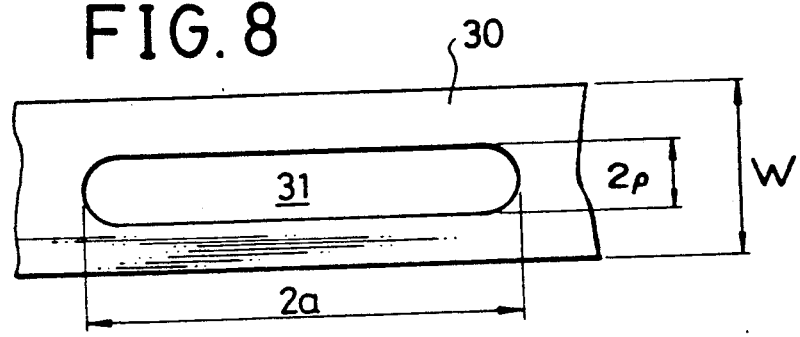
FIGS. 8 and 9 are fragmentary plan views of retainers.

Therefore, the stress at the point A is greatest, with a stress concentration coefficient $\alpha$ being $\alpha \simeq 1.85$. Taking these values into account, the various dimensions of the retainers 30, i.e., the width W of the retainers, the length $2a$ of the slots 31, and the width $2\rho$ of the slots 31 (FIG. 8), are determined.

Figure 9:
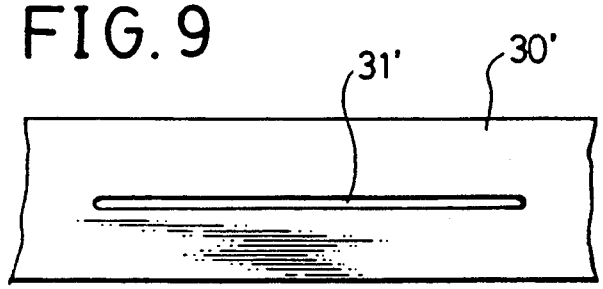

As can be understood from the equations (1) and (2) above, the stress concentration coefficient is determined uniquely by the Poisson ratio, without regard to the width of the slot and the radius of the arcuate edges of the slot. As shown in FIG. 9, therefore, a very narrow oblong hole or slit 31' may be defined in a retainer 30'. The retainer 30' shown in FIG. 9 is of much larger mechanical strength.

Figure 10:
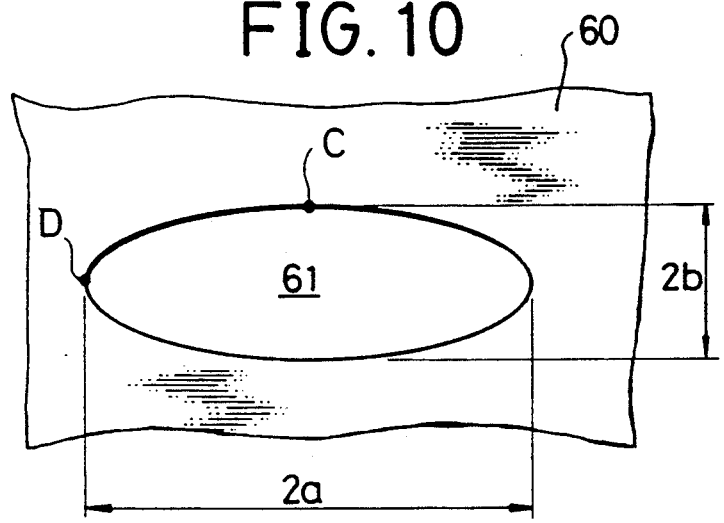
FIG. 10 is a fragmentary plan view of an infinite flat plate with an elliptical hole, which serves as a model to calculate bending stresses.

The maximum value for stress concentration coefficients is 1.85 with respect to the slot 51 shown in FIG. 7A. If the slot is of an elliptical shape as shown in FIG. 10, then the stress concentration coefficient may be smaller for greater mechanical strength for the retainers. Now, such an alternative will be considered below.

As shown in FIG. 10, an infinite flat plate 60 has an elliptical hole 61 which has a major axis having a length of $2a$ and a minor axis having a length of $2b$. When a bending moment normal to the plane of the infinite flat plate 60 and directed along the major axis is applied to the infinite flat plate 60, the infinite flat plate 60 is curved into a cylindrical configuration. Bending stresses applied to the infinite flat plate 60 at respective points C, D are expressed as follows:

$$\sigma C = \frac{\{(3-\nu)+2b/a)\}(1+\nu)}{3+\nu} \times \sigma o \quad (3)$$

$$\sigma D = \frac{\{(1+\nu+2\nu \times (a/b))(1+\nu)\}}{3+\nu} \times \sigma o. \quad (4)$$

If $A = \{(1+84)/(3+\nu)\} \times \sigma o$ and $X = a/b$, then the above equations (3) and (4) are expressed by:

$$\sigma C = A \times (3-\nu+2/X) \quad (5)$$

$$\sigma D = A \times (1+\nu+2\nu X) \quad (6)$$

If $\sigma C/A = \sigma C'$ and $\sigma D/A = \sigma D'$, then the equations (5) and (6) are given as follows:

$$\sigma C' = 2/X + 3 - \nu \quad (7)$$

$$\sigma D' = 2\nu X + \nu + 1 \quad (8).$$

Figure 11:
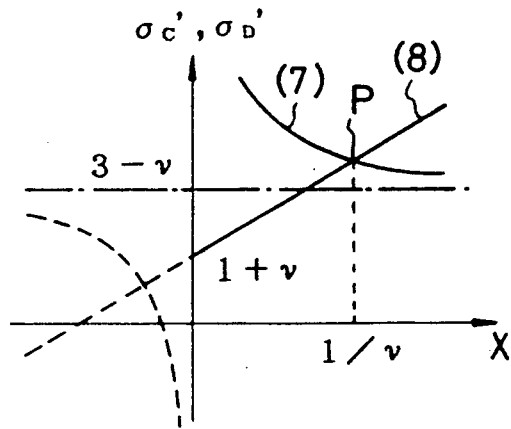
FIG. 11 is a graph showing the relationship stresses on the infinite flat plate with an elliptical hole.

These equations (7) and (8) are plotted in the graph of FIG. 11 which has a horizontal axis representing X and a vertical axis representing $\sigma C', \sigma D'$.

The stress concentration coefficient is minimized at the intersection of the equations (7) and (8), where $X = 1/\nu$. Since $\nu = 0.3$, $X = 10/3$, and $a:b = 10:3$. With the parameters a, b being thus selected, the bending stresses $\sigma C, \sigma D$ are $\sigma C = \sigma D \simeq 1.3 \sigma o$. At this time, the stress concentration coefficient is $\alpha \simeq 1.3$.

Since the retainers are in the form of narrow web-like members, it is preferable that the length $2a$ of the major axis be long, and the length $2b$ of the minor axis be about half the width of the retainers. For example, if the retainers have a width of 16 mm, then the parameter $2b$ is selected to be $2b = 8$ mm, and the parameter $2a$ is $2a = 26.6$ mm. If the stress concentration coefficient $\alpha$ is allowed to have the value of 1.85 for the slot shown in FIG. 5, then the length $2a$ of the major axis may be rendered much longer. In such a case, the ratio of a, b may be a:b=45:8, and the parameter $2b$ is $2b$=8 mm and the parameters $2a$ is $2a$=45 mm.

Figure 12A:
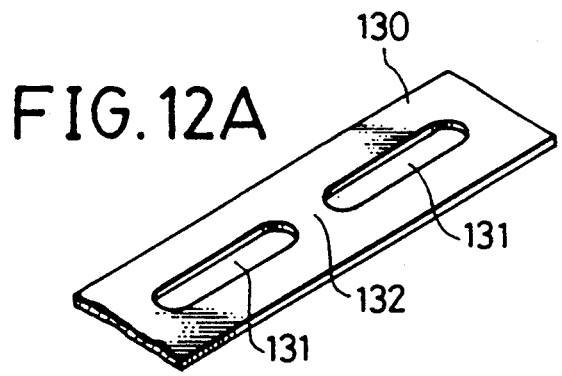
FIGS. 12A and 12B are fragmentary perspective views of a modified retainer.
Figure 12B:
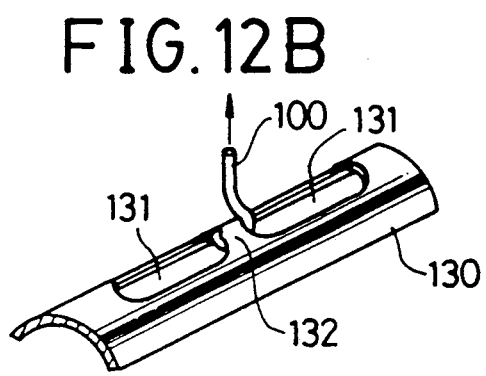

In the above embodiment, one retainer has one slot. However, one retainer may have a plurality of slots. For example, as shown in FIG. 12A, two adjacent slots 131 may be defined in a retainer 130. With such a modification, as shown in FIG. 12B, a hook 100 may engage a bridge portion 132 between the slots 131 and be pulled upwardly to elastically deform the retainer 130 easily into a gutter shape.

Figure 13:
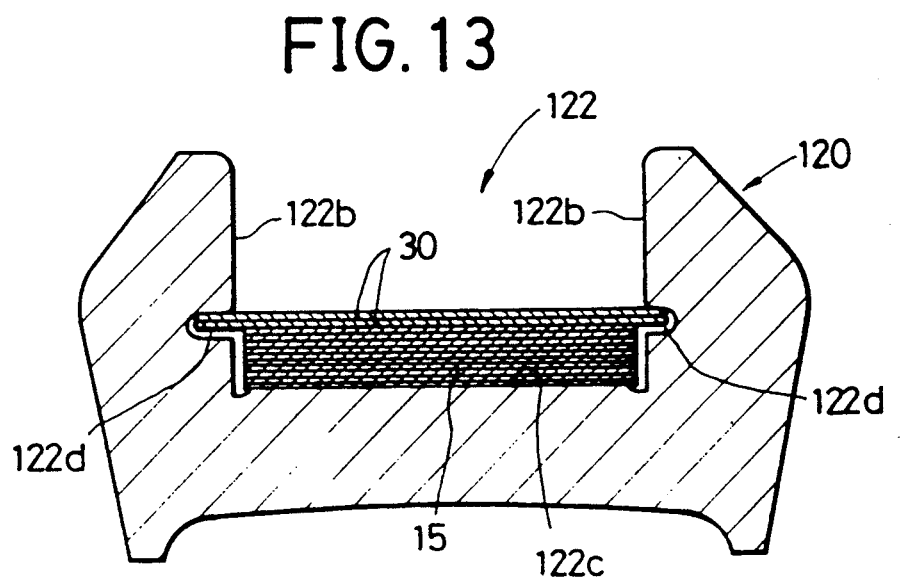
FIG. 13 is a transverse cross-sectional view of a metallic V belt according to another embodiment of the present invention.

The metallic blocks are not limited to the shape in the above embodiment. FIG. 13 shows a metallic block 120 according to another embodiment of the present invention. The metallic block 120 has an upwardly opening strap insertion slot 122 defined therein. The strap insertion slot 122 is defined by a pair of opposite guide edges 122b spaced from each other by a distance that is slightly greater than the width of the belt strap 15, but slightly smaller than the width of the retainers 30. The guide edges 122b have respective attachment grooves 122d defined therein. The attachment grooves 122d have respective bottoms or outer ends spaced from each other by a distance that is slightly larger than the width of the retainers 30. When the retainers 30 are positioned on the belt strap 15 in covering relation thereto, the opposite side edges of the retainers 30 engage respectively in the attachment grooves 122d.

Although certain preferred embodiments have been shown and describe, it should be understood that many changes and modifications may be made therein without departing from the scope of the appended claims.

What is claimed is:

1. A metallic V belt comprising:
    an endless metallic belt strap comprised of a plurality of metallic layers;
    a plurality of metallic blocks each having a strap insertion slot defined therein and opening outwardly from the V belt at one side of the metallic block, said metallic blocks being mounted on said endless metallic belt strap with the endless metallic belt strap positioned in the strap insertion slots in the metallic blocks; and
    at least one retaining belt strap disposed in engagement with portions of said metallic blocks in covering relation to and outwardly of said endless metallic belt strap in said strap insertion slots for retaining said metallic blocks against dislodgement from said endless metallic belt strap, said retaining belt strap being in the form of an endless strap having a flat transverse cross section, said retaining belt strap having at least one hole defined therein.

2. A metallic V belt according to claim 1, wherein said retaining belt strap has two adjacent holes defined therein.

3. A metallic V belt according to claim 1, wherein said hole is an oblong hole extending longitudinally in said retaining belt strap and having semicircular longitudinal ends.

4. A metallic V belt according to claim 3, wherein said oblong hole is a narrow slit defined transversely centrally in said retaining belt strap.

5. A metallic V belt according to claim 1, wherein said hole is an elliptical hole having a major axis extending longitudinally of the retaining belt strap and a minor axis extending transversely of the retaining belt strap.

6. A metallic V belt according to claim 5, wherein said major axis has a length of $2a$ and said minor axis has a length of $2b$, said lengths being selected such that a:b=10:3.

7. A metallic V belt according to claim 5, wherein said major axis has a length of $2a$ and said minor axis has a length of $2b$, said lengths being selected such that a:b=45:8.

8. A metallic V belt according to claim 1, wherein each of said metallic blocks has a pair of spaced guide edges defining said strap insertion slot therebetween and a pair of steps extending from said guide edges, said retaining belt strap having side edges engaging said steps, respectively.

9. A metallic V belt according to claim 1, wherein each of said metallic blocks has a pair of spaced guide edges defining said strap insertion slot therebetween and a pair of attachment grooves defined in said guide edges, respectively, said retaining belt strap having side edges inserted in said attachment grooves, respectively.

10. A metallic V belt according to claim 1, wherein said hole in the retaining belt strap is defined by edges which have arcuately shaped corners at opposite surfaces of the retaining belt strap.

11. A metallic V belt according to claim 1, wherein said hole in the retaining belt strap is defined by edges which have chamfered corners at opposite surface of the retaining belt strap.

12. A metallic V belt according to claim 1, wherein said retraining belt strap comprises a plurality of endless belt straps each having said hole.

13. A metallic V belt according to claim 1, wherein said hole is of a size and shape to allow forced being of said retaining belt strap into a laterally and outwardly curved shaped at the location of the hole for causing disengagement of said portions of said metallic blocks from lateral edge portions of said retaining belt strap.

14. A metallic V belt according to claim 9, wherein said hole is of a size and shape to allow forced bending of said retaining belt strap into a laterally and outwardly curved shape at the location of the hole for causing disengagement of said side edges of said retaining belt strap said attachment grooves in said metallic blocks.

* * * * *